Figure 1:
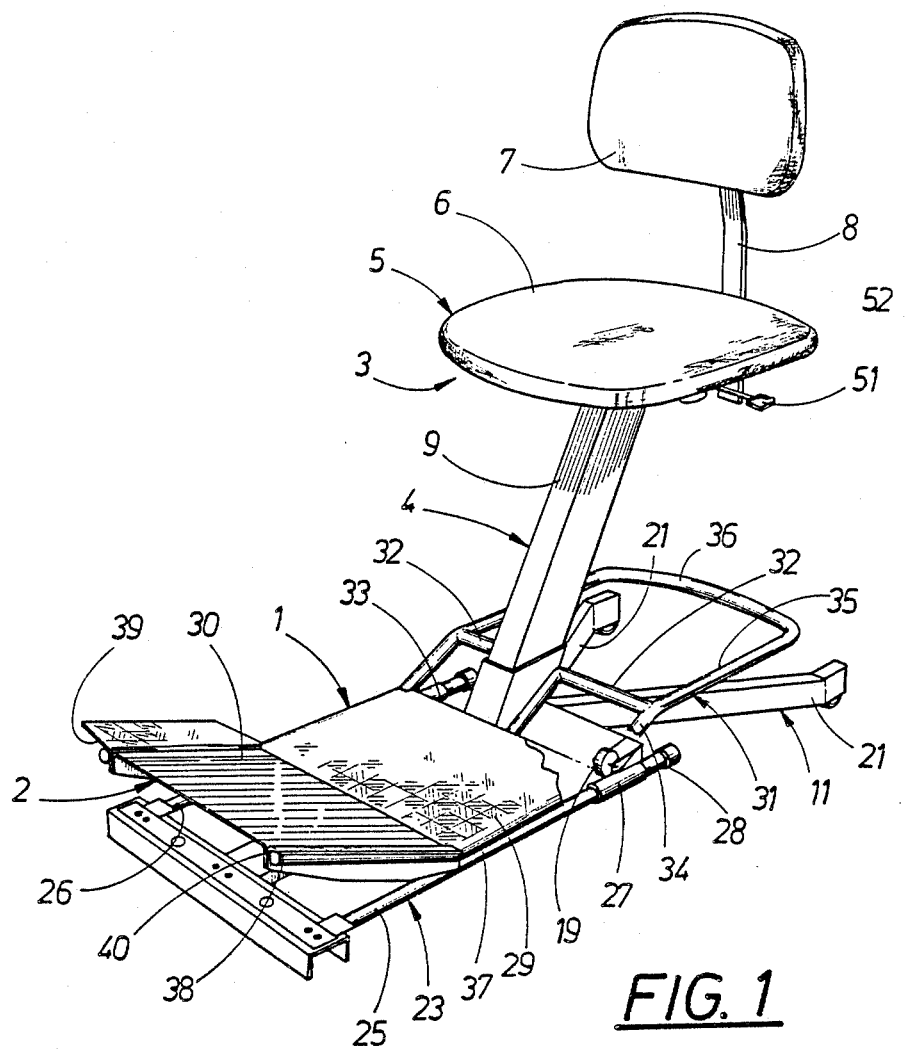

United States Patent [19]

Liedberg et al.

[11] Patent Number: 4,768,831
[45] Date of Patent: Sep. 6, 1988

[54] ARRANGEMENT FOR AN OPERATOR'S SEAT WITH A FOOT CONTROL

[75] Inventors: Lennart Liedberg; Lars Ostlund, both of Gothenburg, Sweden

[73] Assignee: Bohusgruppen Ett Samhällsföretag, Sweden

[21] Appl. No.: 31,015
[22] PCT Filed: Jun. 2, 1986
[86] PCT No.: PCT/SE86/00255
  § 371 Date: Feb. 3, 1987
  § 102(e) Date: Feb. 3, 1987
[87] PCT Pub. No.: WO86/07243
  PCT Pub. Date: Dec. 18, 1986

[30] Foreign Application Priority Data

Jun. 4, 1985 [SE] Sweden .................................. 8502754

[51] Int. Cl.$^4$ .............................. A47C 1/06; A47C 9/02
[52] U.S. Cl. ...................................... 297/345; 297/347; 297/437; 297/346
[58] Field of Search ................ 297/437, 432, 428, 423, 297/347, 345, 346

[56] References Cited

U.S. PATENT DOCUMENTS

| | | | |
|---|---|---|---|
| 573,133 | 12/1896 | Browne | 297/437 X |
| 858,193 | 6/1907 | Mallard | 297/437 X |
| 1,590,240 | 6/1926 | Gorton | 297/437 X |
| 1,620,448 | 3/1927 | Dourdoufis | 297/437 X |
| 1,772,581 | 8/1930 | Powers | 297/437 X |
| 3,256,036 | 6/1966 | Nolan | 297/347 |
| 4,046,419 | 9/1977 | Schmitt | 297/432 |

Primary Examiner—Francis K. Zugel

[57] ABSTRACT

Arrangement for an operator's seat with a foot control for a working machine which can be operated by an operator, the operation of which occurs through the adjustment of the foot control (30) to different angular positions. The foot control acts as a support for at least one of the operator's feet during work and is connected to the seat unit (5) of the operator's seat in such a way that the foot control is connected to the seat unit and is so arranged as to accompany it as it moves. The movements of the seat unit and the accompanying foot control are determined by a guide arrangement connected to the operator's seat, which guide arrangement permits the movement of the operator's seat towards and away from the working machine between different positions for varying the distance between the operator and the working machine without affecting the position of the foot control relative to the seat unit through the aforementioned movements. The foot control is adjustable in relation to the seat unit, in this way giving the operator an ergonomically correct working position irrespective of his physical size. The seat unit (5) is supported by a telescopically extending upright (9) which can be displaced along the guide. The foot control is supported by a foot support unit (1) which can be moved between different heights along the upright (9). Arranged between the foot control and the upright is an essentially horizontal supporting plane (29) for the operator's feet. The upright is inclined rearwards in a direction away from the working machine and constitutes a sloping path for the foot support unit, such that a change in position in the vertical sense will also produce a predetermined change in position in the horizontal sense.

3 Claims, 3 Drawing Sheets

ARRANGEMENT FOR AN OPERATOR'S SEAT WITH A FOOT CONTROL

TECHNICAL FIELD

The present invention relates to an arrangement for an operator's seat with a foot control for a working machine which can be operated by an operator, the operation of which occurs through the adjustment of the foot control to different angular positions, in conjunction with which the foot control is so arranged as to act as a support for at least one of the operator's feet during work and is connected to the seat unit of the operator's seat in such a way that the foot control is connected to the seat unit and is so arranged as to accompany it as it moves, and that the movements of the seat unit and the accompanying foot control are determined by a guide arrangement connected to the operator's seat, which guide arrangement permits the movement of the operator's seat towards and away from the working machine between different positions for varying the distance between the operator and the working machine without affecting the position of the foot control relative to the seat unit through the aforementioned movements, in conjunction with which the foot control is adjustable in relation to the seat unit, in this way giving the operator an ergonomically correct working position irrespective of his physical size, and in conjunction with which the seat unit is supported by a telescopically extending upright which can be displaced along the guide.

TECHNICAL PROBLEM

There are within industry many work operations that are performed in a seated position and are associated with repeated and one-sided patterns of movement, such as precision operations in the areas of assembly, the machining of materials and certain manufacturing operations. Work operations which involve the simultaneous actuation of controls and machining of material call for well synchronized and coordinated movements of the arms/hands and legs/feet and good conditions of vision so as to avoid exposure to unnecessary physical stress. For work of this type the work place itself (table, chair and equipment) must be so designed as to provide a good working position for every individual.

An example of work of this type is provided by machine sewing. This involves performing precision work at a high rate of working, which calls for well synchronized movements of the arms, hands, back, legs and feet, at the same time as which the eyes must be directed towards the foot and the needle of the sewing machine. Working under such conditions places extremely high demands on the ergonomic design of the work place. No great stresses are imposed on the muscles and joints by sewing machine work, although the stresses which are imposed are often of a sustained nature. Muscles and joints in the back, the neck and the shoulders frequently have to adopt the same position for a long time. Many seamstresses in time experience permanent aching mainly in the shoulders, the neck and the back. There is a good deal of evidence to suggest that this is due to the fact that the work place did not provide a good working position. Most of the present-day work places for sewing machinists do not satisfy the requirements in respect of a high degree of adaptability to suit individuals. It is common to find that the chair is unsuitable, the table is at the incorrect height, or the controls are in the wrong position. This can give rise to fixed and static working positions.

The sewing machinist's traditional work place consists of a sewing machine/motor, a table top/stand, controls and a chair. The machine, motor, table, stand and operating controls together form a unit. The free-standing chair is often a simple work chair. The layout of the work place is essentially by the function of the sewing machine and to a lesser extent by human requirements and anthropometric dimensions. Certain possibilities for adjustment are provided, although these are time-consuming and difficult to perform. The range of variation is also too small. What this results in in practice is that no adjustments or only simple adjustments are made.

DESCRIPTION OF THE PRIOR ART

The present invention constitutes a direct further development of the arrangement in accordance with Swedish patent specification No. 81037251, which relates to a work place with an operator's seat which is capable of being displaced between different positions along a guide towards and away from a working machine. The foot control of the working machine accompanies the seat as it moves. The foot control is adjustable to various positions in relation to the seat unit. The previously disclosed solution represents an early stage in the development work in which the fundamental problems associated with the working position were solved.

The aim of the present invention is, as a result of further development work, to further increase the possibility for varied working positions and to facilitate leaving the operator's seat and to simplify its adjustment.

SOLUTION

The aforementioned aim is achieved by an arrangement which is characterized in that the foot control is supported by a foot support unit which can be moved between different heights along the upright, in that there is arranged between the foot control and the upright an essentially horizontal supporting plane for the operator's feet, and in that the upright is inclined rearwards in a direction away from the working machine and constitutes a sloping path for the foot support unit, such that a change in position in the vertical sense will also produce a predetermined change in position in the horizontal sense.

Figure 2:
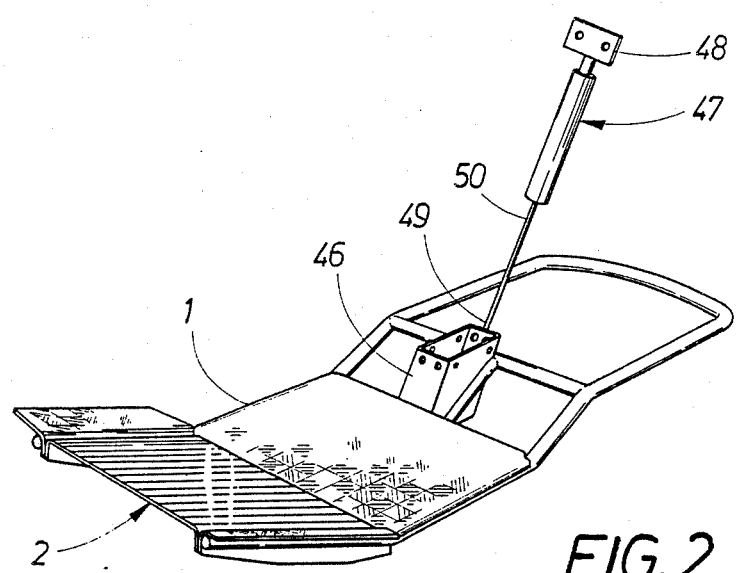
Figure 3:
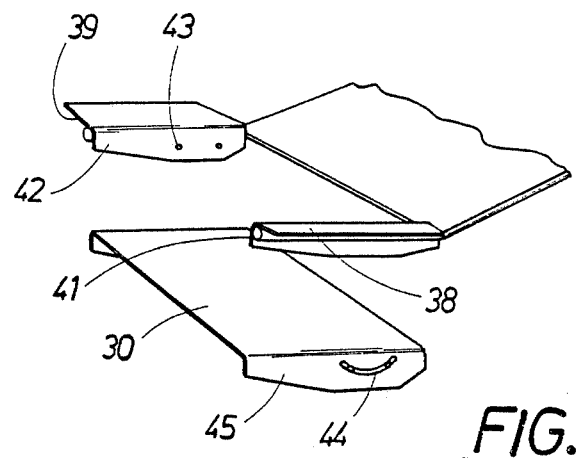
Figure 4:
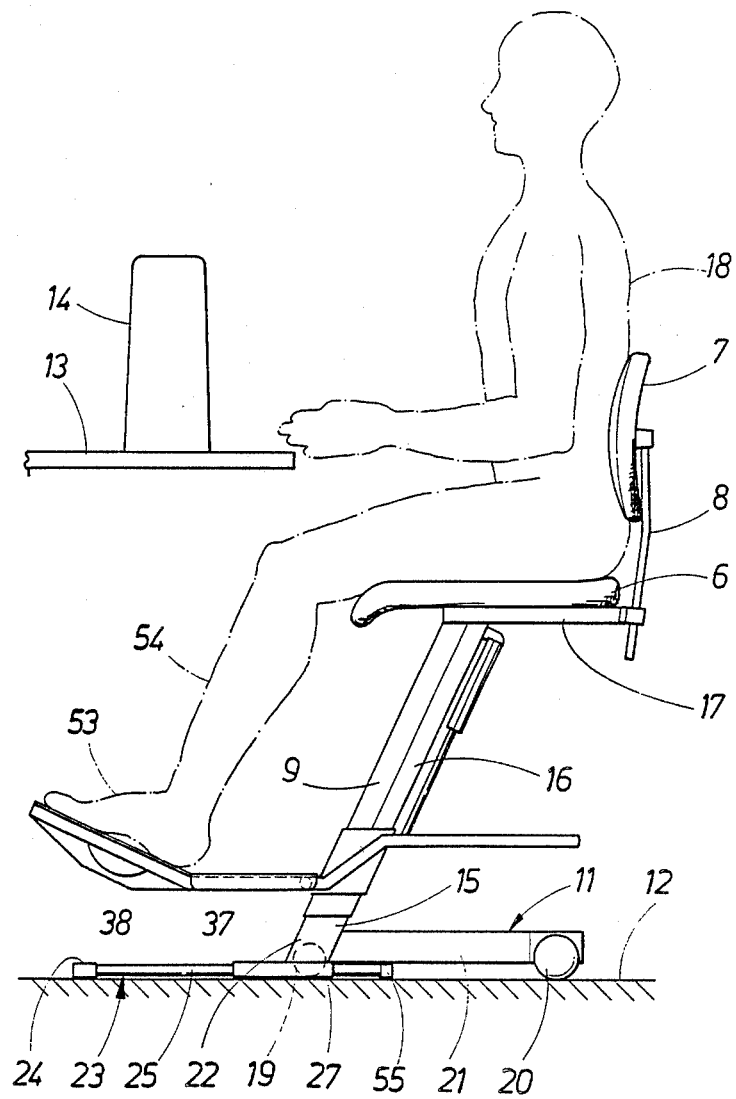

The invention is described below in greater detail in relation to an illustrative embodiment with reference to the accompanying drawings, in which FIG. 1 shows a perspective view of the arrangement in accordance with the invention, FIG. 2 shows a perspective view of a foot unit included in the arrangement, FIG. 3 shows in entirely diagrammatic form a number of components included in the foot unit, and FIG. 4 shows a side view of the arrangement included in a work place with an operator at work.

The arrangement for an operator's seat in accordance with the invention comprises a foot support unit 1 with a foot control 2. The foot support unit is connected to an operator's seat 3 which consists essentially of a sub-frame 4 and a seat unit 5. The latter consists essentially of a seat cushion 6 and a back rest 7. The back rest 7 is supported in a conventional manner by a rail 8, which is adjustable to different heights relative to the other part of the sub-frame and to different angled positions (and thus different positions in the horizontal sense for the back rest) relative to the subframe for the purpose of adjusting the back rest relative to the seat cushion. The back rest 7 can either be freely articulated relative to the rail 8, or can be adjustable to and lockable in various angled positions relative to the rail.

The sub-frame also has a telescopic upright 9 which supports the seat unit 5 and is connected at its base to a carriage 11 included in the sub-frame, by means of which the entire operator's seat can be displaced relative to a base 12, i.e. usually a floor, and also relative to a work table 13, part of which is shown in FIG. 4, and thus relative to a working machine 14 supported by the work table 13. The working machine 14 may consist of, for example, a sewing machine for professional machining, although other working machines may also be appropriate.

The telescopic upright 9 consists of two telescopic components 15, 16, one of which is in the form of a lower telescopic component 15 which is securely attached to the carriage 11, and the other is in the form of an upper telescopic component 16 which can be displaced telescopically relative to the lower part and which at its upper end supports the seat unit 5, more specifically a supporting frame 17 for the seat cushion 6. One telescopic component 15 extends inside the other telescopic component 16, which is designed as a hollow section, preferably a box section of rectangular cross-section. The lower telescopic component 15 is also executed with advantage as a box section of identical form to the upper telescopic component, so that the latter can be moved with a good fit along the lower telescopic component and can be guided by its inward-facing surfaces along the outward-facing surfaces of the lower telescopic component. The upright 9 is thus adjustable with regard to its length for the purpose of displacing the seat unit 5 to various positions relative to the working machine 14. As will be appreciated from the drawings, the upright 9 is inclined rearwards at a suitable angle relative to the base 12. The telescopic lengthening or shortening of the upright 9 is appropriately achieved by means of a power source, for example a drive motor, which is not shown in the drawing, but which may, for example, be an electric motor with a rotating drive shaft and a power transmission arrangement so executed as to permit a linear fore-and-aft movement to be obtained. For example, the drive motor may be installed on the telescopic component 16 and may cause to rotate via a gear drive a screw, i.e. a threaded rod, so supported as to be capable of rotatable inside the telescopic component 16, onto which rod is screwed a nut which is securely attached to the upper end of the lower telescopic component 15. Alternatively, the power may be transmitted via a rack, in which case the electric motor is securely attached to one of the telescopic components, for example the component 15, whilst the rack is securely attached and can be displaced together with the other telescopic component 16. The electric motor may appropriately be a d.c. motor which can easily be reversed by changing over the poles.

The carriage 11, on which the operator's seat is able to move relative to the base 12, exhibits two front and two rear wheels 19, 20. These essentially constitute supporting points for the carriage at its four corners. The two rear wheels are so supported as to be rotatable at the rear end of two arms 21 and are intended to roll on the base 12. The two arms 21 are secured at the front to the lower end of the upright 9, more specifically the fixed, lower telescopic component 15, and diverge from one another in the rearward sense in such a way that the two wheels 20 are situated at a sufficient distance from one another for good stability to be achieved. Similarly, the two front wheels 19 are situated at a well dimensioned distance from one another to either side of the upright 9 and with advantage ahead of its lower end and are so supported as to be rotatable in a holder 22 which is rigidly attached to the lower telescopic component 15 of the upright.

Also a part of the operator's seat is a guide arrangement 23, the position of which is fixed relative to the work table 13 and thus to the working machine 14. The guide arrangement is securely connected in the example shown to a component 24 of a stand belonging to the table 13, which stand is not shown. The guide arrangement is so executed with advantage that it can be placed in one of a large number of pre-determined positions relative to the stand of the work table. The guide arrangement 23 is divided in the example shown into two guides 25, 26 which extend parallel to one another. These two guides 25, 26 consist of tubes which extend along the base 12 and are supported on the base at their two ends in such a way that the tubes suitably extend at a certain distance from the base. Arranged at the rear, free end of the guides are supporting elements 55 which rest against the base 12. It is not normally necessary for the supporting elements 55 to be secured to the base, since the guides 25, 26 are anchored at their front end. These are connected to one another at a predetermined mutual distance by means of a connecting element 56 in the form of a flat metal plate or similar which can be screwed in a number of alternative positions to the sections 24 making up the stand. The tubes may, for example, exhibit circular cross-section. A slide 27 in the form of a tubular sleeve can be displaced along each of the two guides 25, 26, which sleeve encloses the guides and is securely attached to the carriage 11 below the holders 22. Each of the two sleeves 27 exhibits a recess 28 directly opposite the wheels 19, which extend through these recesses and are designed to run on the guides 25, 26. The wheels are with advantage designed with flanges or some other suitable form such that the wheels will achieve good contact against the tubes and will be provided with lateral guidance also by means of the sleeves 27.

By means of the guide arrangement 23 and the ability of the carriage 11 to be displaced along it, the operator's seat is provided with the ability to be displaced relative to the work table 13 and the working machine 14 along an ergonomically determined path, where the distance to the working machine can easily be adjusted by the operator 18 himself taking into account his physical size and his seated position. The route of this path cannot be varied by the operator, however, but is specified at the time of installation of the work place and can thus be adjusted subsequently by other personnel in order to provide correct adaptation to the position of the working machine 14.

The foot support unit 1 is supported by the upright 9 and for this reason accompanies the operator's seat as it is displaced. The foot support unit 1 exhibits a supporting plane 29 in the form of a plate for the operator's feet situated in the immediate vicinity of the upright and, in the example illustrated, in a horizontal attitude. Situated in front of the supporting plane 29 is a foot control 30 in the form of an actuator plate by means of which the working machine 14 is controlled by the operator. The actuator plate 30 is continuously adjustable between pre-determined end positions relative to the supporting plane 29. Extending in a direction rearwards from the supporting plane 29 are long tubular or rod-shaped elements 31, 32 which constitute additional foot rests for occasional support of the feet and for use when leaving the operator's seat. The tubular or rod-shaped components 31, 32 form a frame-like structure in which the components 31, 32 are positioned in such a way that the frame-like structure is situated above the supporting plane 29. The components 32 extend to either side of the upright 9 essentially horizontally and transversely to the longitudinal direction of the guide tubes 25, 26 and at an appropriate height above and at a certain distance horizontally from the rear edge 33 of the supporting plane 29, in such a way that the components 32 are able to provide a support for the operator's feet, so that the operator can sit with his shoes to either side of the upright 9 with the heels resting on the components 32 and with the toes resting against the supporting plane 29. This position provides an occasional resting position to offer a variation in the working position during breaks, or with one foot on the actuator plate 30 and the other foot resting on one of the components 32. The component 31 extends from the supporting plate 29 with an inclined part 34 angled obliquely upwards before then being transformed into a hoop-shaped part which extends essentially horizontally with the supporting plane 29 but on a higher plane relative to the latter. This hoop-shaped part is essentially u-shaped with two legs 35 which are parallel to one another and run essentially parallel to the guide tubes 25, 26 and to a slightly curved connecting piece 36 which connects the legs together. The hoop-shaped part can form a support for the feet with the operator seated or leaving the seat when the seat has been pivoted relative to an imaginary vertical axis. The seat is, in fact, pivotally mounted on the upright 9, and more precisely at its upper part 9, in such a way that the seat unit 5 can be pivoted through at least 90° to either side in order to facilitate leaving the seat.

The supporting part of the foot support unit 1 consists of an extended part of the frame structure which supports both the supporting plane 29 and the actuator plate 30. The supporting part is formed by an extension of the component 34 with two parallel, horizontal parts 37 which support the supporting plane 29 together with cross-members (not shown) between these tubular components. The tubular structure continues from the components 37 as two components 38 extending forwards at a suitable angle relative to the supporting plane 29, which components constitute by means of two angle brackets 39, 40 a mounting for the actuator plate 30.

The mounting for the actuator plate 30 is best appreciated from FIG. 3. Both angle brackets 38, 39 exhibit two parts which are parallel and vertical to one another with a mounting arrangement in the form of two studs 43. These project into a curved slot 44 in two downward-angled parts 45 of the actuator plate 30. This mounting arrangement permits the actuator plate to be pivoted by the application of pressure to the actuator plate outside its geometrical axis of oscillation, that is to say the pressure is applied by varying the angle of the foot. Attached to the actuator plate 30 is a control device (not shown), which may be installed, for example, on the angle bracket 39 and which monitors the angular positions of the actuator plate via a control wire or sensor arm and transmits any changes in position to the control element which controls the working machine 14 in respect of certain of its functions in a previously disclosed fashion.

The foot support unit 1 exhibits a guide sleeve 46 to which the foot support unit 1 is securely attached via parts of the frame structure. The guide sleeve 46 in the shown example is in the form of a hollow section of rectangular cross-section similar to the cross-sectional form of the upright 9 and having a dimension such that it fits closely over the upper telescopic component 16, relative to which the guide sleeve is so arranged as to be displaceable. Through this displacement movement the foot support unit can be adjusted to various heights relative to the seat unit 3 so as to suit different physical sizes of the operators. The displacement movement is achieved by means of a power source 47 which is attached at its one end 48 to the telescopic part 9 of the upright and is attached at its other end 49 to the guide sleeve 46. This power source is an arrangement which provides linear displacement movement of the guide sleeve 46 relative to the upper telescopic component 16 of the upright 9, and the foot support unit is fixed by means of the power source in a specific position relative to the telescopic component 16 and thus to the seat unit 3 and also accompanies the height adjustment movements of the seat unit relative to the lower telescopic component 15 and thus to the work table 13 and the working machine 14. The power source 47 consists, for example, of an electric motor which is so arranged as to cause to rotate a fixed nut threaded onto a rod 50, which rod is caused by the rotation of the electric motor in one direction or the other to be displaced longitudinally, either so as to shorten the power source by raising the rod 50 in the direction of the attachment 48, or so as to lengthen the power source, for which purpose the rod 50 is lowered relative to the attachment 48. This type of power transmission is self-locking, so that the power source will be locked automatically in the desired adjustment positions, which is also applicable to the other power source for the displacement of the telescopic components 15, 16 in the upright 9. It must also be mentioned that the guide sleeve 46 is angled in the same way as the upright 9, so that the supporting plane 29 accordingly extends essentially in the horizontal plane at all times.

The operator is thus prevented by the operator's seat of the type concerned here from selecting the wrong working position to a certain extent because the seat cannot be displaced laterally relative to the working machine 14, which reduces the risk of the operator sitting at an angle to the machine, for example. In the case of the sewing machine 14, for example, the guide arrangement 23 is installed in such a way relative to the stand of the working table 13 that the longitudinal displacement of the operator's seat in a straight line, i.e. the axis of symmetry of the guide arrangement 23, intersects the longitudinal axis of the sewing machine. This has been shown by ergonometric studies to permit an optimum working position for everyone. The considerable range of adjustment of the operator's seat in other respects enables it to be adapted to suit the operator's physical build.

When an operator's working osition is to be set, the operator positions himself on the seat unit 5 facing towards the working machine, whereupon the desired height of the seat unit relative to the work table 13 and thus to the working machine 14 is set by lengthening or shortening the upright 9. This is achieved by means of an operating control 51 on the seat unit which activates the power source (not shown) for the purpose of displacing the upper telescopic component 16 relative to the lower telescopic component 15. The appropriate position of the foot support unit 1 relative to the seat unit 5 can then be achieved, for example, by activating a second operating control 52, in this case an electrical switch for starting the power source 47. The foot support unit is raised or lowered by means of the latter by causing its guide sleeve 46 to be displaced along the upright 9 in order to suit the length of the operator's legs. The foot support unit 1 is imparted with an inclined path of movement by the inclined position of the upright, so that a pre-determined change in position in the vertical sense will also produce a predetermined change in position in the horizontal sense relative to the seat unit, which provides an accurately tested match to the physical proportions of a normal person. A fairly short person with fairly short lower legs will thus require the foot control 30 to be positioned not only closer to the seat unit in a vertical sense, but also at a shorter distance in a horizontal sense from the seat unit in order to the length of that person's upper legs. Finally, the horizontal distance to the work table 13 and the working machine 14 can be set. This is most easily achieved by the operator displacing the operator's seat 3 with the carriage 11 by taking hold of the work table 13 and pulling the seat towards the table or pushing the seat away from the table. Alternatively, the operator may support himself on the base 12 with one or both feet, in this way achieving the necessary displacement. Displacement is thus achieved by the carriage 11 running by its rear wheels 20 on the base 12 and by its two front wheels 19 on the guide tubes 25, 26. If sufficient friction is present between the carriage 11 and the base, the operator's seat will remain in the set displacement position, and otherwise a locking arrangement (not shown) is provided, for example for one of the rear wheels 20 or the front wheels 19, or by locking the sleeve 27 relative to one of the guide tubes 25, 26. The seat unit 5 should preferably be locked in some way against rotation relative to the upright 9, either automatically through the presence of a certain resistance to rotation in a sideways sense, or by means of a manually activated locking arrangement (not shown). The operator's seat is extremely stable, even when the seat unit 5 is being retained in its highest position, due to the positioning of the supporting points and the fact that the guides 25, 26 are enclosed by the sleeves 27. Although these are not secured at one end, tipping is counteracted by the rigidity of the guides and the sleeves 27.

The foot plate 30 can also be finely adjusted in respect of its angular position in relation to the work of the working machine 14. This is done so that the normal position of the actuator plate 30, that is to say the working position which occurs most frequently, will provide the most restful angular position for the operator's foot 53 relative to the lower leg 54. This is set by means of the position-sensing mechanism (not shown), which transmits the angular movements of the foot plate 30 to the control element. In the case of sewing machines it is the working speed of the machine which is regulated in such a way that pressure applied to the front edge of the actuator plate will produce an increase in the speed, whilst sufficiently strong pressure in the opposite direction will, in the case of at least certain machines, cause the direction of operation to be reversed. The intermediate position, which represents the neutral position, is adopted automatically when the foot is removed from the actuator plate. The latter may suitably be covered with a layer of grooved rubber.

It is possible to leave the operator's seat by simply rotating the seat unit 5 relative to the upright 9 and, in the case of a high sitting position, after lowering the seat unit 5 relative to the base and possibly also pushing the seat unit rearwards on the carriage 11. Leaving the seat can be facilitated by placing the feet on the component 35 of the tubular frame, which then has the function of a rung of a ladder. The seat may also be pivoted through 180°, in which case the component 36 of the tubular frame will adopt the corresponding function.

The invention is not restricted to the illustrative embodiment described above and shown in the drawings, but may be modified within the scope of the following patent claims. For example, the various adjustment movements can be performed entirely manually, in which case it is essential for the foot rest unit 1 to accompany the height adjustment movements of the seat unit and thus be fixed relative to the height positions of the seat unit, although the relationship can be varied. The foot plate can be replaced by a perforated, grating-like platform.

We claim:

1. Arrangement for an operator's seat having a foot control for a working machine which can be operated by an operator, the operation of said machine occurring through the adjustment of the foot control to different angular positions, wherein there is provided a movable seat unit, said foot control is adapted to act as a support for at least one of the operator's feet during work and is connected to said seat unit so that the foot control accompanies said seat unit as it moves, a guide means operably connected to the seat unit for determining the movement of said seat unit and foot control, said guide means permitting the movement of said seat unit towards and away from the working machine between different positions for varying the distance between the operator and the working machine without affecting the position of the foot control relative to the seat unit during said movement, and said foot control being adjustable in relation to said seat unit so as to give the operator an ergonomically correct working position irrespective of his physical size, and wherein a telescopically extending upright supports said seat unit so that the seat unit is adjustable between different height positions relative to the working machine, said upright being displaceable along said guide means, a foot rest unit supports said foot control and is movable between different heights along said upright, and an essentially horizontal supporting plane is disposed between said foot control and said upright for the operator's feet, said upright being inclined rearwards in a sloping direction away from said working machine to constitute a sloping path for the seat unit and the foot rest unit so that a change in position in the vertical sense of th seat unit and the foot rest unit will also produce a predetermined change in position in the horizontal sense, and said foot rest unit being adapted to follow the seat unit in its adjustment movements and being also adjustable relative to the seat unit.

2. Arrangement according to claim 1, wherein a tubular frame or the like extends at the sides of said upright and provides additional support for the operator's feet.

3. Arrangement according to claim 2, wherein said tubular frame extends from said supporting plane to a higher level and has portions facing, on the one hand, transversely to the guide means and, on the other hand, essentially parallel to the guide means.

* * * * *